Patented Apr. 23, 1946

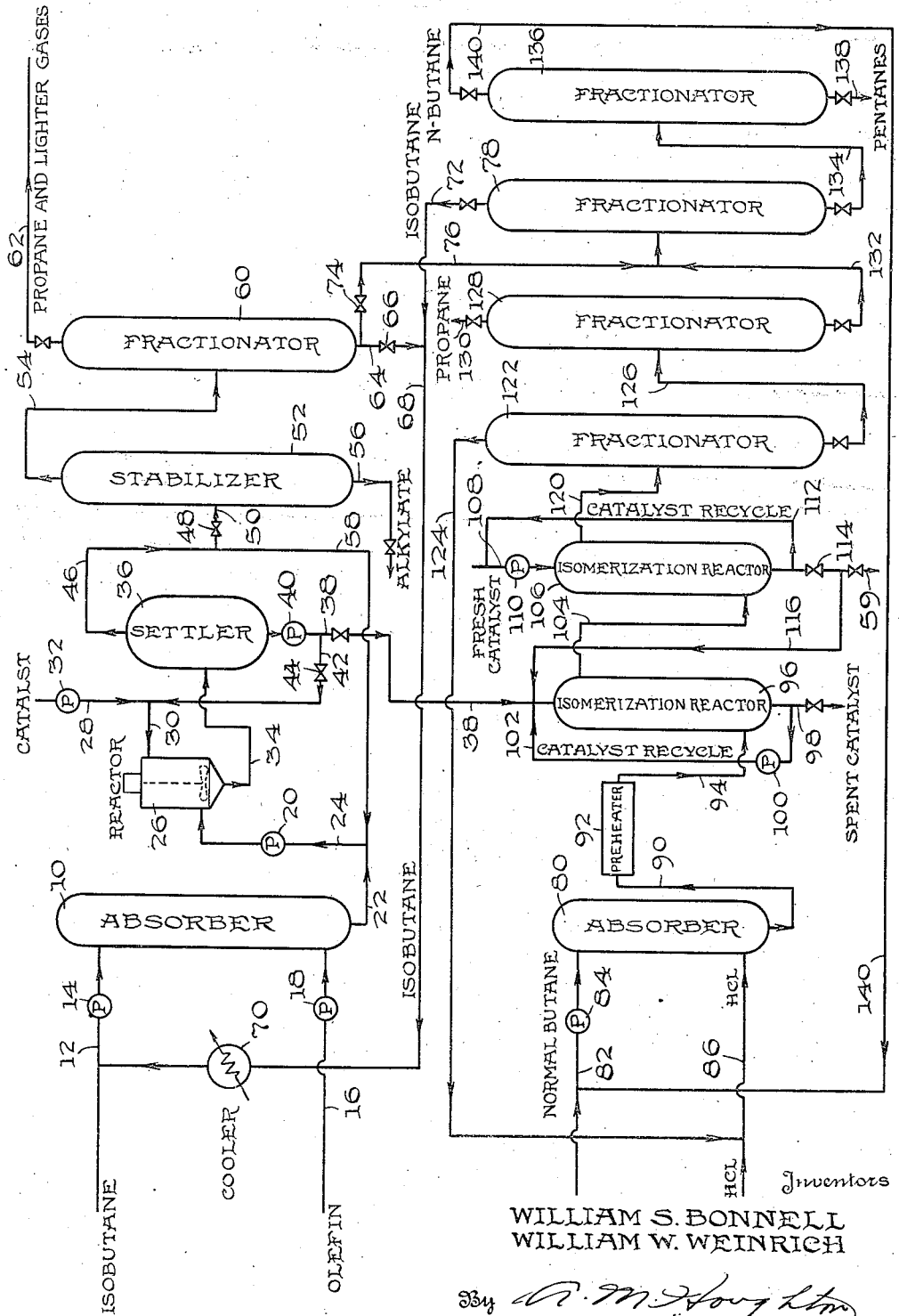

2,399,093

UNITED STATES PATENT OFFICE 2,399,093

CONVERSION OF HYDROCARBONS

William S. Bonnell, Oakmont, and William W. Weinrich, Fox Chapel Borough, Allegheny County, Pa., assignors to Gulf Research & Development Company, Pittsburgh, Pa., a corporation of Delaware Application April 6, 1943, Serial No. 482,042

12 Claims. (Cl. 260—683.4)

The present invention relates to the conversion of hydrocarbons and is more particularly concerned with the coordinated operation of alkylation and isomerization processes in the production of an alkylate.

In the manufacture of high antiknock fuels for internal combustion engines, much reliance has been placed upon the process of alkylation wherein isoparaffins are reacted with one or more of the lower olefins in the presence of a suitable catalyst to produce a highly branched hydrocarbon having an increased number of carbon atoms. Such processes have heretofore utilized refinery and natural gases as the principal source of lower isoparaffins. Frequently, however, the demands exceed the supply of available isoparaffins and it then becomes necessary and desirable to convert normal paraffins, such as normal butane for example, into corresponding iso-compounds for use in the alkylation step.

Among the catalysts hitherto employed in the process of alkylating isoparaffins with olefins, are sulfuric acid, phosphoric acid, hydrogen fluoride and the well-known Friedel-Crafts type of catalyst, such, for example, as the metal halides, to wit, zinc chloride, zirconium chloride, tantalum chloride, beryllium chloride, ferric chloride, boron fluoride and aluminum chloride. The catalytic process of isomerization, on the other hand may be carried out in the presence of Friedel-Crafts catalysts, particularly the aluminum halides, for example aluminum chloride. The catalyst utilization in each of these processes, however, is an important factor since catalyst activity progressively diminishes to a point where its employment becomes no longer economical. The underlying cause of catalyst consumption is not thoroughly understood but it appears that, when aluminum chloride for instance is employed in hydrocarbon reactions, there are accompanying side reactions which ultimately impair its utility. According to one suggestion, the vigorous action of aluminum chloride results in decomposition of the hydrocarbons to supply products which form addition compounds with the catalyst. While these side reactions may be held at a minimum by careful control of the process, it appears impossible or impracticable to totally eliminate them. In all cases there is a direct consumption of catalyst, proportioned on the product produced and where separate processes of alkylation and isomerization are practiced there is normally a total catalyst consumption equal to the combined requirements of these processes.

It is an important object achieved by the present invention to operate correlated alkylation and isomerization processes in such a manner that catalyst consumption is greatly reduced.

Yet more particularly it has been discovered, in connection with the present invention, that catalysts of the Friedel-Crafts type, which have been utilized to promote alkylation to a point where their catalytic activity is completely or substantially exhausted for this purpose, are still capable of catalyzing isomerization reactions. Accordingly, therefore, these catalytic materials, which are largely or substantially exhausted in the alkylation reaction, may be withdrawn and introduced into the isomerization zone in order to isomerize normal or slightly branched hydrocarbons under relatively good conditions of commercial efficiency.

While the catalyst withdrawn from the alkylation zone is not usually quite as active in promoting isomerization as is fresh catalyst, nevertheless when this step is followed by a limited subsequent isomerization treatment in the presence of fresh catalyst a material saving in over-all fresh catalyst requirement results. In short, initial isomerization in the presence of the spent alkylation catalyst, followed by a limited treatment in the presence of fresh catalyst, has been found to result in substantially optimum conversion, fully as good as where isomerization is carried out entirely with fresh catalyst and at an increased rate of consumption.

From the foregoing it will be apparent that the present invention contemplates alkylation and isomerization in the presence of any of the conventional Friedel-Crafts catalysts in any of the forms in which they are commercially known and employed. It is, however, more advantageous to utilize the catalyst in fluid form in which it readily separates from the reaction product and is capable of being handled by pumps. To this end it is preferred, in large scale operations, to employ fluid catalyst sludges formed by the treatment of aluminum chloride with higher boiling hydrocarbons. One such sludge has been described in the copending United States application Serial No. 408,242, filed August 25, 1941. The products there disclosed are advantageously produced by the treatment of aluminum chloride with the higher boiling hydrocarbons resulting from a sulfuric acid alkylation process. Many equivalent materials, however, will, in view of the foregoing, suggest themselves to those skilled in the art.

In order to afford a more complete understanding of the present invention, reference is now made to the drawing, which comprises a flow sheet of a combined alkylation and isomerization process embodying the principles of the present invention. The apparatus therein represented comprises an absorber 10 supplied with isoparaffin through conduit 12 and pump 14. A lower conduit 16 and pump 18 supply suitable olefins, such as ethylene, propylene, or butylene, to the lower portion of the absorber for dissolution within the isoparaffin. While the isoparaffin and olefin employed may vary widely, as will be understood by those skilled in the art, isobutane and ethylene will be hereinafter selected for convenience in exemplification. More specifically, it may be assumed that the conduit 12 handles a hydrocarbon product composed as largely as possible of isobutane but containing a restricted proportion of the usual accompanying hydrocarbons, such for example as normal butane. So also the olefin introduced in conduit 16 may comprise a hydrocarbon gas obtained from the cracking of hydrocarbon oils, and rich in the desired olefin.

In the absorber the liquid phase isobutane dissolves the olefins to form a homogeneous mixture which can be supplied by pump 20 through conduits 22 and 24 to an alkylation reactor 26.

The reactor is preferably constructed so as to insure violent agitation of its contents and may thus comprise a stirrer as indicated, although any other means for promoting intimate contact of the reactants is satisfactory. The catalyst, advantageously in the fluid form hereinabove mentioned, is introduced through the conduits 28 and 30 with the aid of a pump 32. Advantageously, the alkylation reactor 26 is suitably constructed to maintain a temperature between 0° and 100° C., and an elevated pressure ample to assure liquid-phase operation. The invention, moreover, contemplates alkylation in the presence of a hydrohalide such as hydrogen chloride where desired, and to this end a suitable inlet (not shown) may be provided for this promoter.

After residence within the reactor 26 for a sufficient period of time to effect optimum alkylation the product is conveyed through conduit 34 to a settling device 36 wherein the aluminum chloride sludge proceeds to separate and settle to the bottom. Conduit 38 and pump 40 withdraw the sludge and pass a portion of the flow through branched conduit 42, controlled by valve 44, back to the conduit 28 where it is admixed with the incoming fresh catalyst and thus recycled to the reactor 26. The remaining portion of the flow through conduit 38, comprising the partially spent sludge, flows to the isomerization zone, hereinafter described in greater detail.

A portion of the effluent from the settling chamber 36 is withdrawn through conduit 46, valve 48 and conduit 50 into a stabilizer 52 where the isobutane and lighter gases are fractionated off and removed through conduit 54. The bottoms removed from the stabilizer at 56 constitute an alkylate of desired character.

It is to be noted that in the foregoing process a second portion of the effluent in the conduit 46 may be recycled to the reactor 26 through conduits 58 and 24 and pump 20.

The hydrocarbons passing overhead from the stabilizer 52 are carried into a fractionator 60 where propane and the lighter gases are separated and pass off through conduit 62 while the residual isobutane is withdrawn from the bottom as at 64.

A portion of the isobutane thus recovered is recycled through valve 66, conduit 68 and a cooler 70 to the incoming butane conduit 12. Since, however, the isobutane charged to the absorber through conduit 12 usually contains a small proportion of normal butane, it is advantageous to continuously withdraw another portion of the recovered isobutane in order to prevent an objectionable building up of normal butane in the recycle system. This effect is conveniently accomplished in the present process by passing the remainder of the bottoms from the fractionator 60 through valve 74 and conduit 76 to a fractionator 78 operating to separate normal butane from the isobutane. The recovered isobutane together with that produced in the isomerization system is returned through conduit 72 into the conduit 68, as will hereinafter appear in greater detail.

The remainder of the apparatus comprises an isomerization system having an absorber 80 supplied with a normal paraffin, for example such as normal butane, through inlet conduit 82 and pump 84. Hydrogen chloride is introduced into the lower portion of the absorber through conduit 86. The mixture formed in the absorber, comprising a solution of hydrogen chloride in the liquid normal butane is conducted through conduit 90, preheater 92 and conduit 94 to the isomerization reactor 96. It will be noted that the reactor is supplied primarily with catalyst sludge from the settler 36 comprising spent catalyst from the alkylation system. The hydrocarbon mixture accordingly comes into contact with the spent catalyst suitably admixed with recycled catalyst withdrawn from the bottom of the reactor as at 98 and recirculated by means of pump 100 through conduit 102.

The isomerization reaction is preferably carried out in a liquid phase at a temperature between 80° and 150° C. The reactor therefore is suitably constructed to maintain the desired temperature within this range. It may be advantageously supplied with a suitable inert solid filling such as pumice, through which the hydrocarbon mixture is passed in countercurrent relation to the downcoming aluminum chloride sludge.

The partly isomerized hydrocarbon mixture and hydrogen chloride are withdrawn from the reactor 96 through conduit 104 to a second stage isomerization reactor 106. This stage advantageously operates under the influence of fresh catalyst introduced through conduit 108 and pump 110 in sufficient amount and under conditions of contact such as to result in a high yield of isobutane.

It is to be noted that the catalyst sludge accumulating in the bottom of the reactor 106 is partly recycled through conduit 112, the remainder being passed through valve 114 and conduit 116 to the top of the first stage reactor 96 where it combines with the partially spent alkylate catalyst introduced by way of conduit 38. In this way only a relatively small proportion of fresh catalyst is necessary to complete isomerization, a significant proportion of the reaction being carried out under the influence of the residual alkylate catalyst.

Operating in this manner the relatively restricted amount of catalyst introduced through 108 passes through the reactor 106 after combining with the recycled catalyst sludge supplied through 112. The amount of used catalyst passed through the conduit 116 will in practice be equal to the amount of fresh catalyst added through conduit 108. Likewise, the spent catalyst discarded from the first stage isomerization reactor 96, as at 98, will be equivalent to the total amount derived from the alkylation process through conduit 38 and the second stage reactor through conduit 116.

It is important to note that some variation in the foregoing steps is permissible since the catalysts taken from the second stage isomerization reactor 106 may still possess a relatively good catalytic activity. The used catalyst from the second stage may be withdrawn if desired and used in various other processes including, for example, alkylation processes. To this end the two stages of the isomerization reaction may be operated independently so far as catalyst is concerned. Alternatively the fresh catalyst may be recycled in reactor 106 and discarded when it has become fully or partially depleted in catalytic activity as desired. In such a process, the conduit 116 would be omitted and the first stage reactor would proceed to function under the influence solely of the spent alkylation catalyst. Various other modifications will be apparent to those skilled in the art in view of the foregoing. In all modifications, however, the amount of catalyst required for isomerization is less than would be necessary in an equivalent process employing fresh catalyst. The final yield is thus more economically obtained with a substantial saving of critical material.

The isomerized mixture containing the hydrogen chloride promoter is withdrawn from the second stage reactor 106 through conduit 120 to a fractionator 122 wherein the hydrogen chloride is separated and recycled to the absorber 80 through conduit 124, and the inlet line 86. The fractionator bottoms pass by way of conduit 126 to a second fractionator 128 wherein propane and lighter gases are separated and pass off as at 130. The bottoms from this fractionator, comprising for example isobutane, normal butane and pentane, are conveyed through conduit 132 into the fractionator 78 previously mentioned which functions to separate the desired isoparaffins from the normal paraffins and other hydrocarbon impurities. Thus the isobutane passing overhead through line 72, and forming the desired product of the illustrative isomerization process, is carried into the conduit 68 leading to the isoparaffin intake 12 of the alkylation process. The effluent accordingly supplies in part the requirement of the alkylation process. Moreover, as hereinabove noted, the portion of the isobutane mixture withdrawn from the final fractionator 60 of the alkylation system through conduit 76 passes into the fractionator 78 along with the isobutane mixture from the isomerization reactors. By virtue of this arrangement normal butane is continuously removed from the recirculating alkylation system to prevent an objectionable percentage increase of this impurity in the feed to the absorber 10.

The normal butane and pentanes from the bottom of fractionator 78 are conveyed through conduit 134 into fractionator 136 which eliminates the pentanes at 138 and discharges normal butane from overhead through the conduit 140. Conduit 140 in turn recirculates the normal butane back to the absorber 80 through the inlet line 82 and pump 84.

The following specific examples are presented in order to illustrate the detailed operation of the foregoing apparatus in accordance with the principles of the invention:

*Example 1.*—The absorber 10 was charged with ethylene and isobutane containing small amounts of paraffins as impurities. The mixture leaving the bottom of the absorber had a ratio of isobutane to ethylene of 3.4:1 and a ratio of paraffins to ethylene of 4.3:1. The alkylation reactor 26 was operated at a temperature of 130° F., and under an absolute pressure of 364 pounds per square inch.

The catalyst introduced comprised an aluminum chloride sludge produced from aluminum chloride and the higher boiling hydrocarbons of the sulfuric acid alkylation process, and contained about 80 per cent AlCl₃ and 20 per cent alkylate bottoms based on the total weight of the sludge. During the operations the weight balance on the alkylation reactor showed that 10.03 parts by weight of ethylene, 70.90 parts by weight of isobutane and 18.66 parts by weight of other light hydrocarbons which were present as impurities, were charged to the reactor along with 0.41 part by weight of the aluminum chloride sludge. Analysis of the effluent stream showed that 26.66 parts by weight of alkylate having an A. S. T. M. octane number of over 90 was obtained, together with 0.20 part by weight of ethylene, 18.66 parts by weight of light paraffins other than isobutane, and 54.07 parts by weight of isobutane suitable for recycling to the absorber. The amount of spent catalyst withdrawn through conduit 38 was equal to the 0.41 part by weight of catalyst originally introduced into the alkylation unit. The catalyst consumption in this stage amounted to one pound per eleven gallons of alkylate produced at conduit 56.

During this time a butane-HCl mixture was prepared in the absorber 80 and supplied to the first stage isomerization reactor 96. This charge consisted of 0.89 parts by weight of isobutane, 19.88 parts by weight of normal butane, and 0.37 part by weight of pentanes together with 1.75 parts by weight of hydrogen chloride. The 0.41 part by weight of spent catalyst from conduit 38 was permitted to flow downwardly in the reactor through a packing of 2-mesh pumice, while the hydrocarbon-hydrogen chloride mixture was permitted to pass upwardly in countercurrent relationship. The catalyst sludge was recycled through conduit 102 at a rate of 131 parts by weight per hour. In the meantime, 0.41 part of completely consumed catalyst was withdrawn at 98. The reactor was so operated that the normal butane came in contact with the catalyst for 151 minutes at a liquid space velocity of 0.24, under an internal pressure of 664 pounds per square inch and at a maintained temperature of 190° F.

The effluent from the reactor 96 was made up as follows:

| | Parts by weight |
|---|---|
| Isobutane | 3.43 |
| Normal butane | 17.08 |
| Propane plus pentanes | 0.63 |

The effluent was charged by way of conduit 104 to the second stage isomerization reactor during which 0.059 part by weight of fresh aluminum chloride sludge, produced as above, was introduced through conduit 108. In this reactor the contact time was 133 minutes at a liquid space velocity of 0.27 under a pressure and temperature the same as employed in the first stage reactor.

The effluent from the reactor 106 was made up as follows:

| | Parts by weight |
|---|---|
| Isobutane | 8.46 |
| Normal butane | 11.87 |
| Propane | 0.23 |
| Pentanes | 0.61 |

It accordingly contained 40 mol per cent of isobutane.

It is to be noted that in the previous example, the catalyst from the second stage isomerization reactor was, after a short period of recycling, withdrawn and discarded from the conduit 59. In short, conduit 116 was not employed and the two isomerization stages were permitted to function independently, the first under the influence of spent alkylate catalyst and the second in the presence of fresh catalyst. As noted above, however, some additional saving in catalyst consumption is afforded by returning the partly spent catalyst from reactor 106 through conduit 116 to the first stage reactor. In this way only a single point of catalyst withdrawal is provided, at 98, thus assuring more complete catalyst utilization.

It is important to note that in an operation wherein isomerization and alkylation were catalyzed solely by fresh catalyst, materially increased catalyst consumption was necessary in order to effect a comparable conversion. The mixtures of gases treated and the conditions of treatment were otherwise identically the same as in the previous example. More specifically 0.088 part by weight of fresh catalyst was necessary for isomerization. Thus in the isomerization operation 49 per cent more fresh catalyst was required than when the spent catalyst from the alkylation unit was employed.

The present process affords a valuable improvement in the manufacture of alkylate fuels from paraffins and isoparaffins normally available at the refinery. It will be appreciated from the foregoing that the hydrocarbons mentioned in the specific example are suggested only for purposes of illustration and may be substituted by equivalent olefins, isoparaffins or normal paraffins, as the case may be, capable of use in the isomerization or alkylation process. It is to be understood that the invention is not limited to the specific form of apparatus illustrated but may be carried out in various equivalent forms of apparatus. The temperatures, pressures and other conditions moreover may be varied widely within the ranges most suitable and advantageous for the desired conversion effect. The process may be modified, where desired, to operate solely upon a feed of normal or relatively slightly branched paraffins and a suitable olefin, in which case substantially the entire quantity of paraffins fed to the alkylation zone is derived from the isomerization process.

What we claim is:

1. The process for isomerizing paraffin hydrocarbons, and for alkylating branched paraffin isomers for the production of an alkylate fuel, which comprises alkylating an isoparaffin with an olefin in the presence of a Friedel-Crafts catalyst, withdrawing the said catalyst when it has become substantially incapable of effecting further alkylation, isomerizing a paraffin hydrocarbon at a temperature of the order of 80° to 150° C. in the presence of the catalyst withdrawn from the alkylation zone, and subjecting the last-named product to further isomerization in the presence of fresh Friedel-Crafts catalyst at a temperature of the same order as that of the initial isomerization step.

2. The process for isomerizing paraffin hydrocarbons, and for alkylating branched paraffin isomers in the production of an alkylate which comprises alkylating an isoparaffin with an olefin in the presence of a Friedel-Crafts catalyst, withdrawing the said catalyst when it has become substantially incapable of effecting further alkylation, isomerizing a paraffin hydrocarbon at a temperature of the order of 80° to 150° C. in the presence of the catalyst withdrawn from the alkylation zone, subjecting the last-named product to further isomerization in the presence of fresh catalyst at a temperature of the same order as that of the initial isomerization step and supplying the paraffin isomer from the isomerization process as a feed material to the alkylation zone.

3. The process for preparing an alkylate which comprises alkylating an isoparaffin with an olefin in the presence of a Friedel-Crafts catalyst, withdrawing the said catalyst when it has become substantially incapable of effecting further alkylation, subjecting paraffin hydrocarbons at a temperature of the order of 80° to 150° C. to a first stage isomerization in the presence of the catalyst withdrawn from said alkylation zone, subjecting the hydrocarbon mixture from the first stage isomerization to a second stage isomerization in the presence of theretofore unused Friedel-Crafts catalyst at a temperature of the same order as that of the initial isomerization step and supplying isoparaffins from the second stage isomerization as a feed to the alkylation zone.

4. The process for preparing an alkylate fuel which comprises alkylating an isoparaffin with an olefin in the presence of a Friedel-Crafts catalyst, withdrawing the said catalyst when it has become substantially incapable of effecting further alkylation, subjecting paraffin hydrocarbons at a temperature of the order of 80° to 150° C. to a first stage isomerization in the presence of the catalyst withdrawn from said alkylation zone, subjecting the hydrocarbon mixture from the first stage isomerization to a second stage isomerization in the presence of less-spent Friedel-Crafts catalyst at a temperature of the same order as that of the initial isomerization step and supplying partially expended catalyst from the second stage isomerization to said first stage isomerization step and removing from said first stage isomerization that catalyst which is incapable of effecting further isomerization.

5. The process for isomerizing paraffin hydrocarbons, and for alkylating branched paraffin isomers in the production of an alkylate which comprises alkylating an isoparaffin with an olefin in the presence of an aluminum halide catalyst, withdrawing the said catalyst when it has become substantially incapable of effecting further alkylation, isomerizing a paraffin hydrocarbon at a temperature of the order of 80° to 150° C. in the presence of the catalyst withdrawn from the alkylation zone, and subjecting the last-named product to further isomerization in the presence of fresh aluminum halide catalyst at a temperature of the same order as that of the initial isomerization step.

6. The process for preparing an alkylate which comprises alkylating an isoparaffin with an olefin in the presence of a catalyst comprising a liquid aluminum halide-hydrocarbon complex, withdrawing the said catalyst when it has become substantially incapable of effecting further alkylation, subjecting paraffin hydrocarbons to a first stage isomerization at a temperature of the order of 80° to 150° C. in the presence of the catalyst withdrawn from said alkylation zone, subjecting the hydrocarbon mixture from the first stage isomerization to a second stage isomerization in the presence of fresh liquid aluminum-halide-hydrocarbon complex catalyst at a temperature of the same order as that of the initial isomerization step and supplying isoparaffins from the second stage isomerization as a feed to the alkylation zone.

7. The process for producing a hydrocarbon alkylate which comprises isomerizing normal paraffin hydrocarbons to isoparaffins at a temperature of the order of 80° to 150° C. in the presence of a Friedel and Crafts catalyst; subjecting the so-isomerized hydrocarbon and any accompanying unisomerized hydrocarbons to further isomerization in the presence of theretofore unused Friedel and Crafts catalyst at a temperature of the same order as that of the initial isomerization step; alkylating olefinic hydrocarbons with the isoparaffins in the presence of a Friedel and Crafts catalyst; removing catalyst from the alkylation step when it has become substantially incapable of effecting further alkylation and using it as the catalyst in the first isomerization step.

8. The process for producing a hydrocarbon alkylate which comprises isomerizing normal paraffin hydrocarbons to isoparaffins at a temperature of the order of 80° to 150° C. in the presence of a Friedel and Crafts catalyst; subjecting the so-isomerized hydrocarbon and any accompanying unisomerized hydrocarbons to further isomerization in the presence of theretofore unused Friedel and Crafts catalyst at a temperature of the same order as that of the initial isomerization step; alkylating olefinic hydrocarbons with the isoparaffins in the presence of a Friedel and Crafts catalyst; removing catalyst from the alkylation step when it has become substantially incapable of effecting further alkylation and removing partially spent catalyst from the second isomerization step, and using these as the catalyst in the first isomerization step.

9. The process for producing a hydrocarbon alkylate which comprises isomerizing normal paraffin hydrocarbons to isoparaffins at a temperature of the order of 80° to 150° C. in the presence of a fluid aluminum-halide-complex type catalyst; subjecting the so-isomerized hydrocarbon and any accompanying unisomerized hydrocarbons to further isomerization in the presence of theretofore unused fluid aluminum-halide-complex type catalyst at a temperature of the same order as that of the initial isomerization step; alkylating olefinic hydrocarbons with the isoparaffins in the presence of a fluid aluminum-halide-complex type catalyst; removing catalyst from the alkylation step when it has become substantially incapable of effecting further alkylation and using it as the catalyst in the first isomerization step.

10. The process for producing a hydrocarbon alkylate which comprises isomerizing normal paraffin hydrocarbons to isoparaffins at a temperature of the order of 80° to 150° C. in the presence of a fluid aluminum-halide-complex type catalyst; subjecting the so-isomerized hydrocarbon and any accompanying unisomerized hydrocarbons to further isomerization in the presence of theretofore unused fluid aluminum-halide-complex type catalyst at a temperature of the same order as that of the initial isomerization step; alkylating olefinic hydrocarbons with the isoparaffins in the presence of a fluid aluminum-halide-complex type catalyst; removing catalyst from the alkylation step when it has become substantially incapable of effecting further alkylation and removing partially spent catalyst from the second isomerization step, and using these as the catalyst in the first isomerization step.

11. The process for producing a hydrocarbon alkylate which comprises isomerizing normal paraffin hydrocarbons to isoparaffins at a temperature of the order of 80° to 150° C. in a plurality of stages in the presence of a Friedel and Crafts catalyst; conducting the successive isomerization steps at temperatures of the same order; alkylating olefinic hydrocarbons with the said isoparaffins in the presence of a Friedel and Crafts catalyst; introducing fresh catalyst into the last isomerization stage and into the alkylation step; circulating catalyst through successive isomerization stages from the last isomerization stage to the first isomerization stage, removing catalyst from the alkylation step when it has become substantially incapable of effecting further alkylation and introducing this catalyst into the isomerization catalyst at an isomerization stage prior to the last such stage.

12. The process for producing a hydrocarbon alkylate which comprises isomerizing normal paraffin hydrocarbons to isoparaffins at a temperature of the order of 80° to 150° C. in a plurality of stages in the presence of a fluid aluminum-halide-complex type catalyst; conducting the successive isomerization steps at temperatures of the same order; alkylating olefinic hydrocarbons with the said isoparaffins in the presence of a fluid aluminum-halide-complex type catalyst; introducing fresh catalyst into the last isomerization stage and into the alkylation step; circulating catalyst through successive isomerization stages from the last isomerization stage to the first isomerization stage, removing catalyst from the alkylation step when it has become substantially incapable of effecting further alkylation and introducing this catalyst into the isomerization catalyst at an isomerization stage prior to the last such stage.

WILLIAM S. BONNELL.
WILLIAM W. WEINRICH.